(12) United States Patent
Rippelmeyer

(10) Patent No.: US 10,844,937 B2
(45) Date of Patent: Nov. 24, 2020

(54) MULTISPEED AUTOMATIC TRANSMISSION FOR ELECTRIFIED VEHICLES

(71) Applicant: Toyota Motor North America, Inc., Plano, TX (US)

(72) Inventor: Luke A. Rippelmeyer, Farmers Branch, TX (US)

(73) Assignee: Toyota Motor North America, Inc., Plano, TX (US)

( * ) Notice: Subject to any disclaimer, the term of this patent is extended or adjusted under 35 U.S.C. 154(b) by 62 days.

(21) Appl. No.: 15/929,059

(22) Filed: Nov. 12, 2018

(65) Prior Publication Data
US 2020/0149612 A1    May 14, 2020

(51) Int. Cl.
*F16H 3/66* (2006.01)
*F16H 3/44* (2006.01)

(52) U.S. Cl.
CPC ....... *F16H 3/666* (2013.01); *F16H 2003/445* (2013.01); *F16H 2200/0039* (2013.01); *F16H 2200/0043* (2013.01); *F16H 2200/2005* (2013.01); *F16H 2200/2035* (2013.01); *F16H 2200/2038* (2013.01); *F16H 2200/2041* (2013.01); *F16H 2200/2097* (2013.01)

(58) Field of Classification Search
CPC .... F16H 2003/445; F16H 3/663; F16H 3/666; F16H 2200/0039; F16H 2200/0043; F16H 2200/2005; F16H 2200/2035; F16H 2200/2038; F16H 2200/2041; F16H 2200/2097

See application file for complete search history.

(56) References Cited

U.S. PATENT DOCUMENTS

| | | |
|---|---|---|
| 6,481,553 B1 | 11/2002 | Lee |
| 2003/0186775 A1 | 10/2003 | Ishimasu et al. |
| 2006/0172850 A1 | 8/2006 | Sung |
| 2006/0264296 A1 | 11/2006 | Moeller |
| 2009/0062056 A1 | 3/2009 | Kato et al. |
| 2009/0098974 A1 | 4/2009 | Phillips |
| 2011/0230299 A1 | 9/2011 | Kraynev et al. |
| 2011/0251013 A1 | 10/2011 | Phillips |
| 2013/0005526 A1 | 1/2013 | Matsubara et al. |
| 2015/0330492 A1 | 11/2015 | Lee et al. |

*Primary Examiner* — Jacob S. Scott
(74) *Attorney, Agent, or Firm* — Christopher G. Darrow; Darrow Mustafa PC

(57) ABSTRACT

A transmission includes a compound planetary gear set. The compound planetary gear set includes multiple sun gears and a non-input/output ring gear, a long pinion gear meshed therebetween, and an output planetary carrier carrying the long pinion gear. The long pinion gear includes multiple steps, and is meshed with the sun gears respectively at the steps and with the non-input/output ring gear at one step. With each sun gear alternatively being input-only or non-input/output, the sun gears are selectively input-only one at a time. Moreover, the non-input/output ring gear is anti-rotary and the output planetary carrier is output-only when the sun gears are input-only one at a time.

20 Claims, 5 Drawing Sheets

| Speed | Clutch Operation | | | Transmission Ratio |
|---|---|---|---|---|
| | C1 | C2 | C3 | |
| 1 | ● | ○ | ○ | $1+(N_{ST1}/N_{S1})*(N_R/N_{ST3})$ |
| 2 | ○ | ● | ○ | $1+(N_{ST2}/N_{S2})*(N_R/N_{ST3})$ |
| 3 | ○ | ○ | ● | $1+N_R/N_{S3}$ |

| Speed | Clutch Operation | | | | Transmission Ratio |
|---|---|---|---|---|---|
| | C1 | C2 | C3 | C4 | |
| 1 | ● | ○ | ○ | ○ | $1+(N_{ST1}/N_{S1})*(N_R/N_{ST3})$ |
| 2 | ○ | ● | ○ | ○ | $1+(N_{ST2}/N_{S2})*(N_R/N_{ST3})$ |
| 3 | ○ | ○ | ● | ○ | $1+N_R/N_{S3}$ |
| 4 | ○ | ○ | ○ | ● | 1.00 |

| Speed | Clutch Operation | | | | Transmission Ratio |
|---|---|---|---|---|---|
| | C1 | C2 | C3 | C4 | |
| 1 | ● | ○ | ○ | ○ | $1+(N_{ST1}/N_{S1})*(N_R/N_{ST3})$ |
| 2 | ○ | ● | ○ | ○ | $1+(N_{ST2}/N_{S2})*(N_R/N_{ST3})$ |
| 3 | ○ | ○ | ● | ○ | $1+N_R/N_{S3}$ |
| 4 | Multiple ● | | | ● | 1.00 |

MULTISPEED AUTOMATIC TRANSMISSION FOR ELECTRIFIED VEHICLES

TECHNICAL FIELD

The embodiments disclosed herein relate to vehicles and, more particularly, to vehicles that have electrified powertrains.

BACKGROUND

Many vehicles are electrified vehicles or, in other words, vehicles that have an electrified powertrain. The vehicles typically have more or less traditional drivetrains. Specifically, as part of the drivetrains, the vehicles include wheels, as well as differentials, drive shafts and the like connected to the wheels. However, in place of engines and transmissions, the vehicles include electric motors. And, as part of the powertrains, the electric motors are connected to the drivetrains. In conjunction with the drivetrains, the electric motors are operable to power the wheels.

Vehicle manufactures, among others, may desire to connect the electric motors to the drivetrains through transmissions. Relatedly, vehicle manufactures, among others, may desire multispeed automatic transmissions suited for the use of the electric motors to power the wheels through the transmissions.

SUMMARY

Disclosed herein are embodiments of a transmission that includes componentry for a multispeed automatic configuration, and a vehicle with a transmission that includes componentry for a multispeed automatic configuration through which an electric motor is connected to a drivetrain to power a wheel. In one aspect, a transmission includes a compound planetary gear set. The compound planetary gear set includes multiple sun gears and a non-input/output ring gear, a long pinion gear meshed therebetween, and an output planetary carrier carrying the long pinion gear. The long pinion gear includes multiple steps, and is meshed with the sun gears respectively at the steps and with the non-input/output ring gear at one step. With each sun gear alternatively being input-only or non-input/output, the sun gears are selectively input-only one at a time. Moreover, the non-input/output ring gear is anti-rotary and the output planetary carrier is output-only when the sun gears are input-only one at a time.

In another aspect, a vehicle includes a drivetrain with a wheel, an electric motor, and a transmission through which the electric motor is connected to the drivetrain to power the wheel. The transmission includes an input from which the electric motor is connected, and an output to which the drivetrain is connected. The transmission also includes a compound planetary gear set connected from the input to the output. The compound planetary gear set includes multiple sun gears connectable from the input and a non-input/output ring gear, a long pinion gear meshed therebetween, and an output planetary carrier carrying the long pinion gear and connected to the output. The long pinion gear includes multiple steps, and is meshed with the sun gears respectively at the steps and with the non-input/output ring gear at one step. With each sun gear alternatively being input-only or non-input/output, the sun gears are selectively input-only one at a time. Moreover, the non-input/output ring gear is anti-rotary and the output planetary carrier is output-only when the sun gears are input-only one at a time.

In yet another aspect, a transmission includes a rotary input, a rotary output and a compound planetary gear set. The compound planetary gear set includes multiple rotary sun gears and a non-input/output ring gear, a long pinion gear meshed therebetween, and a rotary output planetary carrier carrying the long pinion gear and sharing a downstream rotary connection with the output. The long pinion gear includes multiple steps, and is meshed with the sun gears respectively at the steps and with the non-input/output ring gear at one step. The transmission also includes multiple rotary connecting clutches between the input and the sun gears respectively. By the operation of the connecting clutches, with each sun gear alternatively only sharing an upstream rotary connection with the input or not sharing either an upstream rotary connection or a downstream rotary connection, the sun gears selectively only share the upstream rotary connections with the input one at a time. Moreover, in the case in which the sun gears only share the upstream rotary connections with the input one at a time, the non-input/output ring gear is anti-rotary and the output planetary carrier only shares the downstream rotary connection with the output.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches a representative electrified vehicle that includes a multispeed automatic transmission suited for the use of electric motors to power wheels through the transmission. The transmission has implementations in which one compound planetary gear set with multiple sun gears and stepped long pinion gears is used to establish multiple same-sign transmission ratios corresponding with multiple unidirectional speeds.

Semi-Tractor Electrified Vehicle

Figure 1:
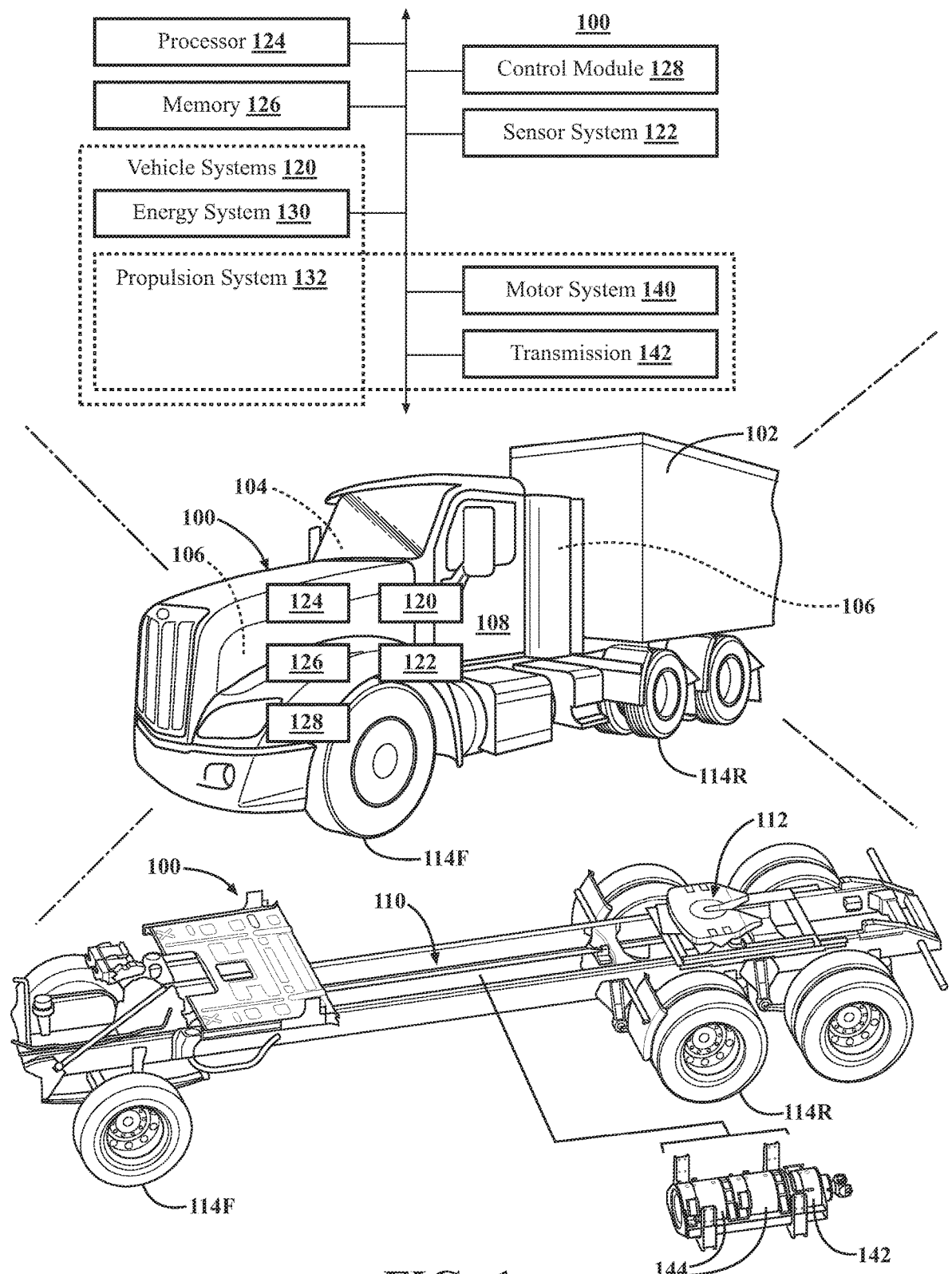
FIG. 1 is a portrayal of a vehicle using a block diagram and perspective views, showing a drivetrain with wheels, electric motors, and a multispeed automatic transmission through which the electric motors are connected to the drivetrain to power the wheels.

A representative electrified vehicle 100 is shown in FIG. 1. In this description, uses of "front," "forward" and the like, and uses of "rear," "rearward" and the like, refer to the longitudinal directions of the vehicle 100. "Front," "forward" and the like refer to the front (fore) of the vehicle 100, while "rear," "rearward" and the like refer to the back (aft) of the vehicle 100. Uses of "side," "sideways," "transverse" and the like refer to the lateral directions of the vehicle 100, with "driver's side" and the like referring to the left side of the vehicle 100, and "passenger side" and the like referring to the right side of the vehicle 100.

The vehicle 100 is a semi-tractor or, in other words, a tractor unit that, together with a hitched semitrailer 102, forms a semi-truck. The vehicle 100 has an exterior and a number of interior compartments. The compartments include a passenger compartment 104 and one or more engine compartments 106. The vehicle 100 may include, among other things, seats and a dash assembly housed in its passenger compartment 104.

The vehicle 100 has a body 108 that forms its exterior and defines its compartments. The body 108 has upright sides, a floor, a front end, a rear end, a roof and the like. In the semi-truck to which the vehicle 100 belongs, the semitrailer 102 similarly has an exterior and, as an interior compartment, a cargo compartment for carrying cargo. In addition to the body 108, the vehicle 100 has a chassis 110. The chassis 110 serves as an underbody for the vehicle 100. The chassis 110, like the body 108, forms the exterior of the vehicle 100. As part of the chassis 110, the vehicle 100 includes a hitch 112 for hitching the semitrailer 102 to the vehicle 100. With the semitrailer 102 hitched to the vehicle 100, the vehicle 100 is operable to pull the semitrailer 102 and any onboard cargo.

The vehicle 100 has a drivetrain. The drivetrain is part of, mounted to or otherwise supported by the chassis 110. The drivetrain may be housed, in whole or in part, in any combination of the passenger compartment 104, the engine compartments 106 or elsewhere in the vehicle 100. As part of the drivetrain, the vehicle 100 includes wheels 114. The wheels 114 support the remainder of the vehicle 100 on the ground. The vehicle 100 includes ten wheels 114, two of which are front wheels 114F, and eight of which are rear wheels 114R. The rear wheels 114R are arranged in four dual-wheel setups. The rear wheels 114R belonging to two driver's side dual-wheel setups are shown, with the other two, passenger side dual-wheel setups being mirror images that include the remaining rear wheels 114R. One, some or all of the wheels 114 are powered to drive the vehicle 100 along the ground. In a rear-wheel drive arrangement, one, some or all of the rear wheels 114R are powered to drive the vehicle 100 along the ground. For this purpose, also as part of the drivetrain, in addition to the wheels 114, the vehicle 100 includes any penultimate combination of a differential, a drive shaft and the like mechanically connected to the wheels 114.

The vehicle 100 operates as an assembly of interconnected items that equip the vehicle 100 to perform one or more vehicle functions. With respect to performing vehicle functions, the vehicle 100 is subject to any combination of manual operation and autonomous operation. In the case of manual operation, the vehicle 100 may be manual-only. In the case of autonomous operation, the vehicle 100 may be semi-autonomous, highly-autonomous or fully-autonomous.

For purposes of performing vehicle functions, the vehicle 100 includes one or more vehicle systems 120. Either alone or in conjunction with the drivetrain, the vehicle systems 120 are operable to perform vehicle functions on behalf of the vehicle 100. Any combination of the vehicle systems 120 may be operable to perform a vehicle function. Accordingly, from the perspective of a vehicle function, one, some or all of the vehicle systems 120 serve as associated vehicle systems 120. Moreover, each vehicle system 120 may be operable to perform any combination of vehicle functions, in whole or in part. Accordingly, each vehicle system 120, from its own perspective, serves as an associated vehicle system 120 for one or more vehicle functions.

In addition to the vehicle systems 120, the vehicle 100 includes a sensor system 122, as well as one or more processors 124, memory 126, and a control module 128 to which the vehicle systems 120 and the sensor system 122 are communicatively connected. The sensor system 122 is operable to detect information about the vehicle 100. The processors 124, the memory 126 and the control module 128 together serve as one or more computing devices whose control module 128 is employable to orchestrate the operation of the vehicle 100. Specifically, the control module 128 operates the vehicle systems 120 based on information about the vehicle 100. Accordingly, as a prerequisite to operating the vehicle systems 120, the control module 128 gathers information about the vehicle 100, including the information about the vehicle 100 detected by the sensor system 122. The control module 128 then evaluates the information about the vehicle 100, and operates the vehicle systems 120 based on its evaluation.

Vehicle Systems.

The vehicle systems 120 are part of, mounted to or otherwise supported by the chassis 110. The vehicle systems 120 may be housed, in whole or in part, in any combination of the passenger compartment 104, the engine compartments 106 or elsewhere in the vehicle 100. Each vehicle system 120 includes one or more vehicle elements. On behalf of the vehicle system 120 to which it belongs, each vehicle element is operable to perform, in whole or in part, any combination of vehicle functions with which the vehicle system 120 is associated. It will be understood that the vehicle elements, as well as the vehicle systems 120 to which they belong, may but need not be mutually distinct.

The vehicle systems 120 include an energy system 130 and a propulsion system 132. The energy system 130 and the propulsion system 132 are electrically connected to one another. Moreover, the propulsion system 132 and the drivetrain are mechanically connected to one another. The propulsion system 132 and the drivetrain together serve as an electrified powertrain for the vehicle 100. The energy system 130 is operable to perform one or more energy functions, including but not limited to generating electrical energy, as well as storing, conditioning and otherwise handling electrical energy. In conjunction with the drivetrain, the propulsion system 132 is operable to perform one or more propulsion functions using electrical energy from the energy system 130, including but not limited to powering the wheels 114. With the wheels 114 powered, the propulsion system 132 is employable to accelerate the vehicle 100, maintain the speed of the vehicle 100 (e.g., on level or uphill ground) and otherwise drive the vehicle 100 along the ground.

In addition to the energy system 130 and the propulsion system 132, the vehicle systems 120 may include one or more auxiliary systems, including a braking system, a steering system, an accessory system and the like. The auxiliary systems are electrically connected to the energy system 130. The auxiliary systems are operable to perform one or more auxiliary functions using electrical energy from the energy system 130, including but not limited to braking the vehicle 100, steering the vehicle 100 and one or more accessory functions.

In any combination of fuel cell, plug-in, range-extending, hybrid and like arrangements, the energy system 130 may include any combination of one or more fuel cells, one or more engines, one or more generators and like energy elements operable to generate electrical energy for use by the propulsion system 132 and the auxiliary systems. Alternatively, or additionally, the energy system 130 may include one or more batteries and like energy elements operable to store electrical energy for use by the propulsion system 132 and the auxiliary systems. In relation to these and other energy elements, the energy system 130 may include one or more handling units operable to condition and otherwise handle electrical energy therefrom, including but not limited to distributing electrical energy and conditioning electrical energy (e.g., converting DC electrical energy into three-phase AC electrical energy, converting a certain voltage DC electrical energy into a different voltage DC electrical energy, etc.).

The propulsion system 132 includes a motor system 140 and a multispeed automatic transmission 142. Among the propulsion elements of the motor system 140, the vehicle 100 includes one or more motors 144. Although the vehicle 100, as shown, includes two motors 144, it will be understood that this disclosure is applicable in principle to otherwise similar vehicles including one motor 144, as well as otherwise similar vehicles otherwise including multiple motors 144. The motors 144 are axially integrated for codependent spinning action. The motors 144 may, for example, be synchronous three-phase AC or other types of electric motors. In the drivetrain, any penultimate combination of the transmission 142, a drive shaft, a differential and the like are mechanically connected to the wheels 114. The motors 144 are electrically connected to the energy system 130. Moreover, the motors 144 are mechanically connected to the drivetrain through the transmission 142 as part of the electrified powertrain for the vehicle 100. With the motors 144 thus mechanically connected to the drivetrain, in conjunction with the drivetrain, the motors 144 are operable to power the wheels 114 through the transmission 142 using electrical energy from the energy system 130. The transmission 142 has multiple speeds and, in association with the motors 144 powering the wheels 114 therethrough, is operable to shift between the speeds.

Sensor System.

As part of the sensor system 122, the vehicle 100 includes one or more onboard sensors. The sensors monitor the vehicle 100 in real-time. The sensors, on behalf of the sensor system 122, are operable to detect information about the vehicle 100, including information about user requests and information about the operation of the vehicle 100.

The vehicle 100 includes user controls. The user controls serve as interfaces between users of the vehicle 100 and the vehicle 100 itself, and are operable to receive mechanical, verbal and other user inputs requesting vehicle functions. In conjunction with corresponding user controls, and among the sensors, the vehicle 100 includes an accelerator pedal sensor, a brake pedal sensor, a steering angle sensor and the like, and one or more selector sensors, one or more microphones, one or more cameras and the like. Relatedly, among information about user requests, the sensor system 122 is operable to detect user inputs requesting powering the wheels 114, and user inputs requesting braking, steering and the like.

Also among the sensors, the vehicle 100 includes one or more speedometers, one or more gyroscopes, one or more accelerometers, one or more inertial measurement units (IMUs), one or more wheel sensors, one or more transmission sensors, one or more controller area network (CAN) sensors and the like. Relatedly, among information about the operation of the vehicle 100, the sensor system 122 is operable to detect the location and motion of the vehicle 100, including its speed, acceleration, orientation, rotation, direction and the like, the movement of the wheels 114, the shifting of the transmission 142 between the speeds, and the operational statuses of one, some or all of the vehicle systems 120.

Control Module.

As noted above, the processors 124, the memory 126 and the control module 128 together serve as a computing device whose control module 128 orchestrates the operation of the vehicle 100, including but not limited to the operation of the vehicle systems 120. The control module 128 may be a global control module. Relatedly, as part of a central control system, the vehicle 100 may include a global control unit to which the control module 128 belongs. Although the vehicle 100, as shown, includes one control module 128, it will be understood that this disclosure is applicable in principle to otherwise similar vehicles including multiple control modules 128.

The processors 124 are any components configured to execute any of the processes described herein or any form of instructions to carry out such processes or cause such processes to be performed. The processors 124 may be implemented with one or more general purpose or special purpose processors. Examples of suitable processors 124 include microprocessors, microcontrollers, digital signal processors or other forms of circuitry that execute software. Other examples of suitable processors 124 include without limitation central processing units (CPUs), array processors, vector processors, digital signal processors (DSPs), field programmable gate arrays (FPGAs), programmable logic arrays (PLAs), application specific integrated circuits (ASICs), programmable logic circuitry or controllers. The processors 124 may include at least one hardware circuit (e.g., an integrated circuit) configured to carry out instructions contained in program code. In arrangements where there are multiple processors 124, the processors 124 may work independently from each other or in combination with one another.

The memory 126 is a non-transitory computer readable medium. The memory 126 may include volatile or nonvolatile memory, or both. Examples of suitable memory 126 includes random access memory (RAM), flash memory, read only memory (ROM), programmable read only memory (PROM), erasable programmable read only memory (EPROM), electrically erasable programmable read only memory (EEPROM), registers, magnetic disks, optical disks, hard drives or any other suitable storage medium, or any combination of these. The memory 126 includes stored instructions in program code. Such instructions are executable by the processors 124 or the control module 128. The memory 126 may be part of the processors 124 or the control module 128, or may be communicatively connected the processors 124 or the control module 128.

Generally speaking, the control module 128 includes instructions that may be executed by the processors 124. The control module 128 may be implemented as computer readable program code that, when executed by the processors 124, execute one or more of the processes described herein. Such computer readable program code may be stored on the memory 126. The control module 128 may be part of the processors 124, or may be communicatively connected the processors 124.

Transmission

Figures 2A, 2B:
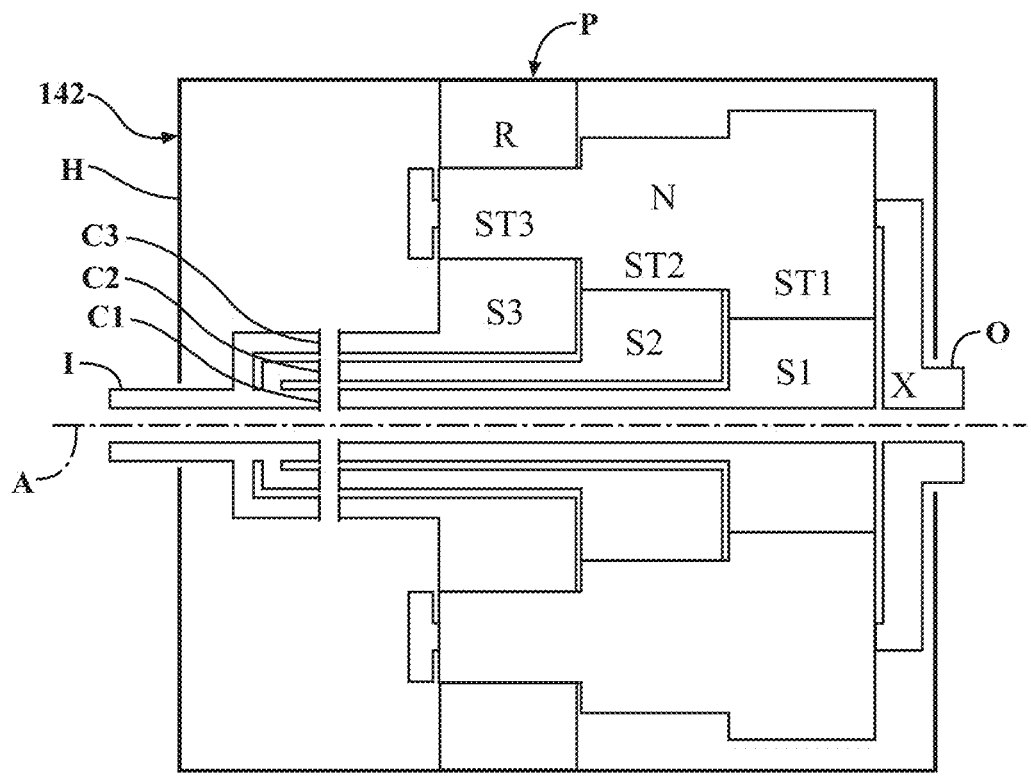
FIGS. 2A, 3A and 4A are schematic views of representative implementations of the transmission that include componentry for a multispeed automatic configuration, each showing an input, an output, a compound planetary gear set with multiple sun gears and stepped long pinion gears for transferring axial rotation of the input into axial rotation of the output, and clutches for shifting the transmission between the speeds.
FIGS. 2B, 3B and 4B are operational charts for the representative implementations of the transmission in FIGS. 2A, 3A and 4A, respectively, each showing aspects of the transmission shifting between the speeds using the clutches.
Figures 3A, 3B:
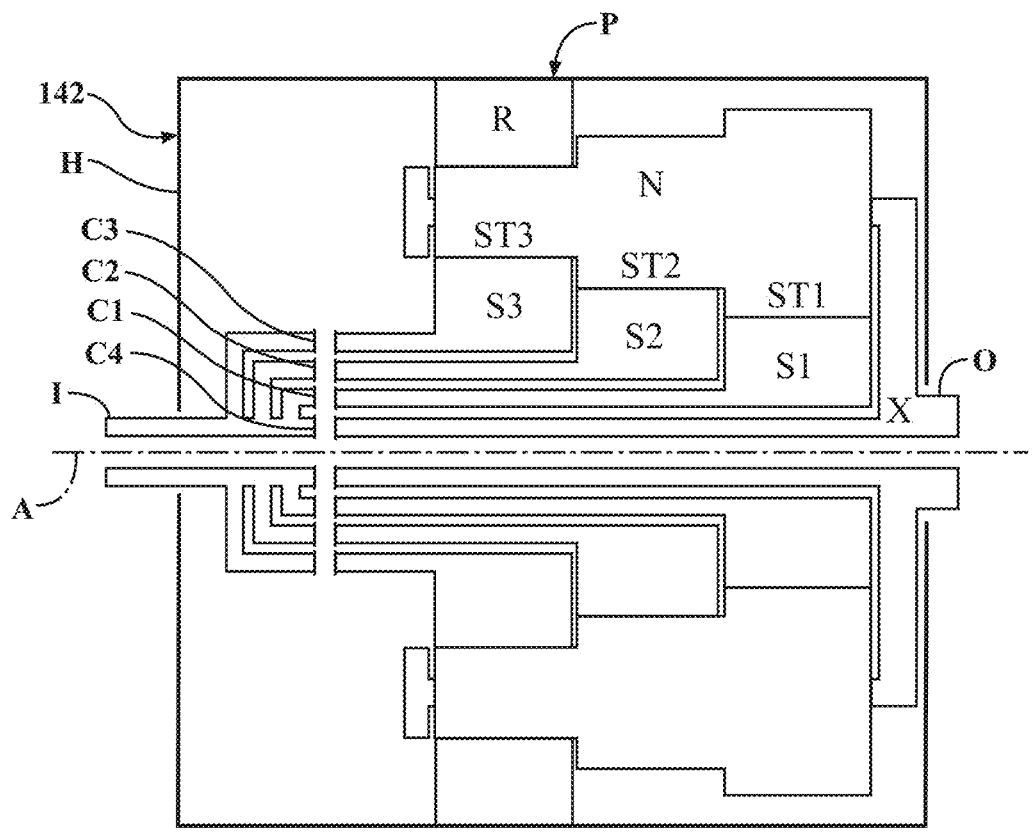
Figures 4A, 4B:
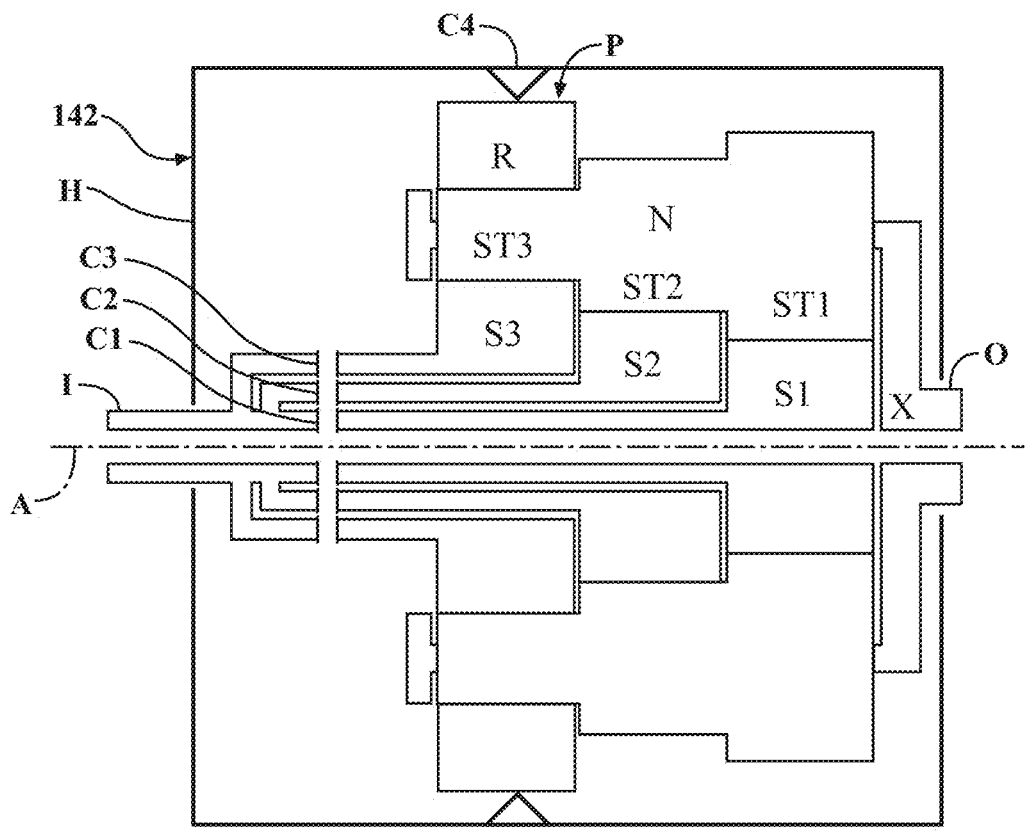

Representative implementations of the transmission 142 are shown in FIGS. 2A, 3A and 4A. In each implementation thereof, the transmission 142 has a transmission axis A. The transmission axis A serves as a common axis of rotation for the transmission 142. Along the transmission axis A, the transmission 142 includes a leading shaft-like rotary input I, and a culminating shaft-like rotary output O in an axially spaced relationship with the input I. Moreover, the transmission 142 includes one intermediate compound planetary gear set P, and multiple intermediate clutches C about the compound planetary gear set P.

As noted above, the transmission 142 has multiple speeds, and is operable to shift between the speeds. The speeds correspond to multiple transmission ratios or, in other words, numbers of input I revolutions for every output O revolution. In the transmission 142, the input I and the output O are axially aligned with one another along the transmission axis A for axial rotation at the transmission ratios. The compound planetary gear set P is axially aligned with the input I and the output O along the transmission axis A for multiple states of interconnected motion in which the compound planetary gear set P establishes the transmission ratios and transfers axial rotation of the input I into axial rotation of the output O at the transmission ratios. From their positions about the compound planetary gear set P, the clutches C are operable to shift the transmission 142 between the speeds by switching the compound planetary gear set P between the states of interconnected motion.

The compound planetary gear set P includes multiple externally toothed rotary sun gears S in an axially spaced relationship with one another, a surrounding internally toothed non-input/output ring gear R in a radially spaced relationship with the sun gears S, and one or more intermediate externally toothed stepped long pinion gears N axially spanning the sun gears S. Moreover, the compound planetary gear set P includes a rotary output planetary carrier X. The long pinion gears N are meshed between the sun gears S and the non-input/output ring gear R, and the output planetary carrier X carries the long pinion gears N for meshing between the sun gears S and the non-input/output ring gear R. The sun gears S and the non-input/output ring gear R are coaxially aligned with one another on the transmission axis A for any combination of axial rotation, holding against axial rotation, release for axial rotation, grounding and the like. From their positions between the sun gears S and the non-input/output ring gear R, the long pinion gears N are circumferentially spaced about the transmission axis A for planetary motion. From its position to carry the long pinion gears N, the output planetary carrier X is coaxially aligned with the sun gears S and the non-input/output ring gear R on the transmission axis A for axial rotation common with the planetary motion of the long pinion gears N.

In addition to the input I, the output O, the compound planetary gear set P and the clutches C, the transmission 142 includes a surrounding housing H. Using the housing H, the transmission 142 houses the compound planetary gear set P and the clutches C, and exposes the input I and the output O. Moreover, the transmission 142 supports the input I and the output O for axial rotation, supports the compound planetary gear set P for interconnected motion, and supports the clutches C about the compound planetary gear set P. Specifically, the transmission 142 supports the input I for powered axial rotation by the motors 144, supports the compound planetary gear set P for powered interconnected motion by the input I, and supports the output O for powered axial rotation by the compound planetary gear set P. Relatedly, the transmission 142 supports the clutches C about the compound planetary gear set P for switching the compound planetary gear set P between the states of interconnected motion.

In relation to the sun gears S, each long pinion gear N is elongate and, along its length, includes multiple externally toothed steps ST in an axially spaced relationship with one another. Specifically, each long pinion gear N includes one step ST per sun gear S in a radially aligned relationship with the sun gear S, and is meshed with the sun gears S respectively at the steps ST. Although compound planetary gear set P, as shown, includes a total of three sun gears S and long pinion gears N each including a total of three steps ST, it will be understood that this disclosure is applicable in principle to otherwise similar compound planetary gear sets otherwise including multiple sun gears S and long pinion gears N each including multiple steps ST, including but not limited to otherwise similar compound planetary gear sets including a total of two sun gears S and long pinion gears N each including a total of two steps ST, and otherwise similar compound planetary gear sets including more than three sun gears S and long pinion gears N each including more than three steps ST.

The sun gears S include a first sun gear S1, a second sun gear S2 and a third sun gear S3. Among other things, it follows that, in each long pinion gear N, the steps ST include a first step ST1 in a radially aligned relationship with the first sun gear S1, a second step ST2 in a radially aligned relationship with the second sun gear S2, and a third step ST3 in a radially aligned relationship with the third sun gear S3. Moreover, the long pinion gear N is meshed with the first sun gear S1 at the first step ST1, is meshed with the second sun gear S2 at the second step ST2, and is meshed with the third sun gear S3 at the third step ST3.

The sun gears S have different pitch diameters and, in association with their different pitch diameters, different numbers of teeth. As shown, the first sun gear S1 may, for example, have a first pitch diameter and an associated first number of teeth. Moreover, the second sun gear S2 may, for example, have a relatively larger second pitch diameter and an associated relatively greater second number of teeth. Moreover, the third sun gear S3 may, for example, have a relatively larger third pitch diameter and an associated relatively greater third number of teeth. Relatedly, in each long pinion gear N, the steps ST have different pitch diameters and, in association with their different pitch diameters, different numbers of teeth. As shown, the first step ST1 may, for example, have a first pitch diameter and an associated first number of teeth. Moreover, the second step ST2 may, for example, have a relatively smaller second pitch diameter and an associated relatively lesser second number of teeth. Moreover, the third step ST3 may, for example, have a relatively smaller third pitch diameter and an associated relatively lesser third number of teeth.

In addition to being meshed with the sun gears S respectively at the steps ST, each long pinion gear N includes one step ST in a radially aligned relationship with the non-input/output ring gear R, and is meshed with the non-input/output ring gear R at the step ST. As shown, in each long pinion gear N, the long pinion gear N may, for example, be meshed with the non-input/output ring gear R at the third step ST3. Among other things, it follow that the step ST at which the long pinion gear N is meshed with the non-input/output ring gear R may, for example, be the same as the step ST at which the long pinion gear N is meshed with the sun gear S having the largest pitch diameter and the associated greatest number of teeth among the sun gears S. Moreover, the step ST at which the long pinion gear N is meshed with the non-input/output ring gear R may, for example, be the step ST with the smallest pitch diameter and the associated least number of teeth among the steps ST.

Figure 5A:
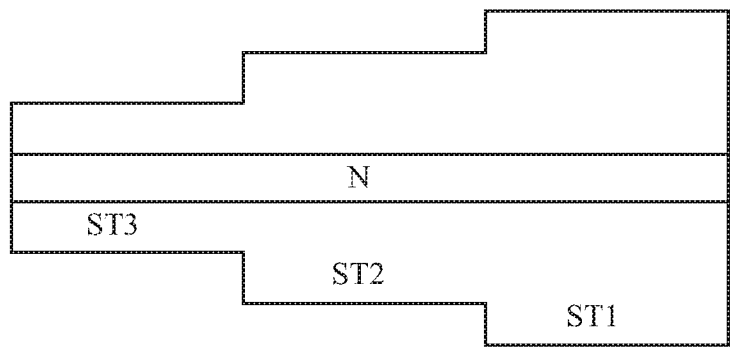
FIGS. 5A-5C are schematic cross sectional views of the long pinion gears, showing representative constructions thereof.
Figure 5B:
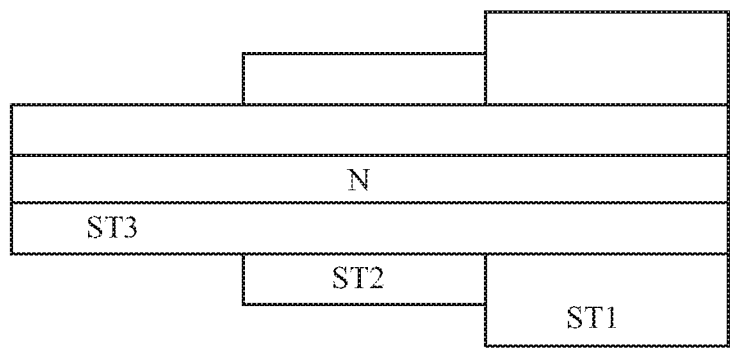
Figure 5C:
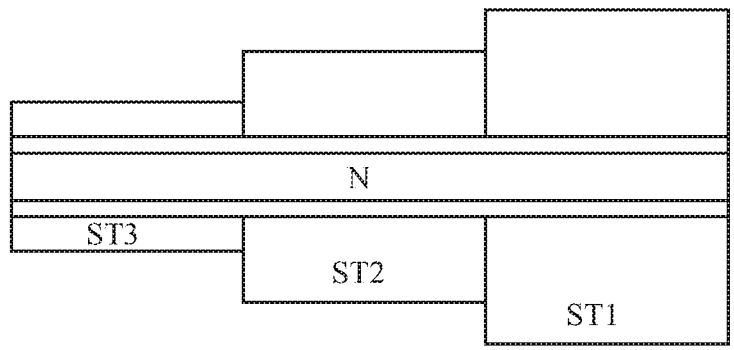

One, some or all of the long pinion gears N may feature a unitary whole construction. As shown with additional reference to FIG. 5A, for example, the long pinion gears N, including the steps ST and their teeth, may be machined from singular elongate pieces of material. Alternatively, or additionally, one, some or all of the long pinion gears N may feature an integrated multi-piece construction. As shown with additional reference to FIG. 5B, for example, the long pinion gears N may include elongate shaft-like bases forming the steps ST with the smallest pitch diameters among the steps ST, as well as their teeth, and annular externally toothed gears splined or otherwise permanently connected along the bases to form the remaining steps ST. As shown with additional reference to FIG. 5C, for example, the long pinion gears N may include elongate shaft-like bases that do not form any of the steps ST, and annular externally toothed gears splined or otherwise permanently connected along the bases to form the steps ST.

In each state of interconnected motion, the compound planetary gear set P is interconnected from the input I to the output O. The input I, the compound planetary gear set P and the output O are part of a relationship in which the compound planetary gear set P is the only planetary gear set interconnected from the input I to the output O. Moreover, the input I is connected to the compound planetary gear set P, the compound planetary gear set P is connected from the input I and to the output O, and the output O is connected from the compound planetary gear set P, but the compound planetary gear set P is not otherwise interconnected between the input I and the output O.

Specifically, from the input I to the output O, the input I, the compound planetary gear set P and the output O serially share rotary connections or, in other words, direct connections that establish common axial rotation therebetween. In relation thereto, the compound planetary gear set P includes a rotary acting input item associated with the sun gears S. From the perspective of the compound planetary gear set P, the acting input item shares an upstream rotary connection with the input I. Accordingly, the compound planetary gear set P is connected from the input I at the acting input item. Moreover, the output planetary carrier X shares a downstream rotary connection with the output O. As shown, the output planetary carrier X may, for example, share a splined or otherwise permanent downstream rotary connection with the output O. Accordingly, the compound planetary gear set P is connected to the output O at the output planetary carrier X.

With the acting input item assuming axial rotation common with the input I, the compound planetary gear set P transfers axial rotation of the acting input item into axial rotation of the output planetary carrier X. With the output O assuming axial rotation common with the output planetary carrier X, the compound planetary gear set P, with its interconnected motion, accordingly transfers axial rotation of the input I into axial rotation of the output O. Relatedly, in each state of interconnected motion, the compound planetary gear set P establishes the transmission ratio at which it transfers axial rotation of the input I into axial rotation of the output O. Specifically, the compound planetary gear set P has a stage ratio or, in other words, number of acting input item revolutions for every output planetary carrier X revolution. The transmission ratio, in turn, is the product of the stage ratio.

As shown with additional reference to FIGS. 2B, 3B and 4B, to establish multiple same-sign transmission ratios corresponding with multiple unidirectional speeds, the compound planetary gear set P has multiple states of interconnected motion. In relation to the speeds, the transmission ratios and the states of interconnected motion, the compound planetary gear set P has multiple same-sign stage ratios. Specifically, by the operation of the clutches C, the compound planetary gear set P alternatively has a first planetary stage ratio, a relatively lower second planetary stage ratio or a relatively lower third planetary stage ratio. Relatedly, the transmission 142 has a first speed corresponding to a first transmission ratio, a second speed corresponding to a relatively lower second transmission ratio, and a third speed corresponding to a relatively lower third transmission ratio. In the first speed, to establish the first transmission ratio, the compound planetary gear set P has a first state of interconnected motion in which the compound planetary gear set P has the first planetary stage ratio. In the second speed, to establish the second transmission ratio, the compound planetary gear set P has a second state of interconnected motion in which the compound planetary gear set P has the second planetary stage ratio. In the third speed, to establish the third transmission ratio, the compound planetary gear set P has a third state of interconnected motion in which the compound planetary gear set P has the third planetary stage ratio.

In relation to the compound planetary gear set P, and the first planetary stage ratio, the second planetary stage ratio and the third planetary stage ratio, the transmission 142 includes multiple rotary connecting clutches C about the input I. Specifically, the transmission 142 includes one connecting clutch C per sun gear S between the input I and the sun gears S respectively. Among other things, it follows that one of the clutches C is a first connecting clutch C1 between the input I and the first sun gear S1, one of the clutches C is a second connecting clutch C2 between the input I and the second sun gear S2, and one of the clutches C is a third connecting clutch C3 between the input I and the third sun gear S3. As shown, the first connecting clutch C1, the second connecting clutch C2 and the third connecting clutch C3 may, for example, be dog-type. In a normally-disengaged configuration, from its position between the input I and the first sun gear S1, the first connecting clutch C1 is left to disengage from between the input I and the first sun gear S1, whereby the first sun gear S1 does not share an upstream rotary connection with the input I. Alternatively, the first connecting clutch C1 is operable to engage between the input I and the first sun gear S1, whereby the first sun gear S1 shares a clutched upstream rotary connection with the input I. Moreover, in a normally-disengaged configuration, from its position between the input I and the second sun gear S2, the second connecting clutch C2 is left to disengage from between the input I and the second sun gear S2, whereby the second sun gear S2 does not share an upstream rotary connection with the input I. Alternatively, the second connecting clutch C2 is operable to engage between the input I and the second sun gear S2, whereby the second sun gear S2 shares a clutched upstream rotary connection with the input I. Moreover, in a normally-disengaged configuration, from its position between the input I and the third sun gear S3, the third connecting clutch C3 is left to disengage from between the input I and the third sun gear S3, whereby the third sun gear S3 does not share an upstream rotary connection with the input I. Alternatively, the third connecting clutch C3 is operable to engage between the input I and the third sun gear S3, whereby the third sun gear S3 shares a clutched upstream rotary connection with the input I.

As noted above, in each state of interconnected motion, the compound planetary gear set P includes an acting input item associated with the sun gears S that shares an upstream rotary connection with the input I. In association with the acting input item, each sun gear S, from its own perspective, selectively shares an upstream rotary connection with the input I. In relation thereto, by the operation of the connecting clutches C1-C3, each sun gear S is alternatively input-only or non-input/output. Specifically, from the perspective of each sun gear S, when the first connecting clutch C1 is operated to engage between the input I and the first sun gear S1, the first sun gear S1 only shares an upstream rotary connection with the input I. Alternatively, when the first connecting clutch C1 is left to disengage from between the input I and the first sun gear S1, the first sun gear S1 does not share either an upstream rotary connection with the input I or a downstream rotary connection with the output O. Moreover, when the second connecting clutch C2 is operated to engage between the input I and the second sun gear S2, the second sun gear S2 only shares an upstream rotary connection with the input I. Alternatively, when the second connecting clutch C2 is left to disengage from between the input I and the second sun gear S2, the second sun gear S2 does not share either an upstream rotary connection with the input I or a downstream rotary connection with the output O. Moreover, when the third connecting clutch C3 is operated to engage between the input I and the third sun gear S3, the third sun gear S3 only shares an upstream rotary connection with the input I. Alternatively, when the third connecting clutch C3 is left to disengage from between the input I and the third sun gear S3, the third sun gear S3 does not share either an upstream rotary connection with the input I or a downstream rotary connection with the output O.

Moreover, from the perspective of the compound planetary gear set P, the sun gears S may serve as the acting input item and, in their roles as the acting input item, share upstream rotary connections with the input I. In relation thereto, by the operation of the connecting clutches C1-C3, the sun gears S are selectively input-only one at a time, with the remaining sun gears S being non-input/output. Specifically, either the first connecting clutch C1, the second connecting clutch C2 or the third connecting clutch C3 is operated to engage between the input I and either the first sun gear S1, the second sun gear S2 or the third sun gear S3, as the case may be. In association with operating the first connecting clutch C1 to engage between the input I and the first sun gear S1, the second connecting clutch C2 and the third connecting clutch C3 are left to disengage from between the input I and the second sun gear S2 and the third sun gear S3 respectively. Moreover, in association with operating the second connecting clutch C2 to engage between the input I and the second sun gear S2, the first connecting clutch C1 and the third connecting clutch C3 are left to disengage from between the input I and the first sun gear S1 and the third sun gear S3 respectively. Moreover, in association with operating the third connecting clutch C3 to engage between the input I and the third sun gear S3, the first connecting clutch C1 and the second connecting clutch C2 are left to disengage from between the input I and the first sun gear S1 and the second sun gear S2 respectively.

In relation to sharing a downstream rotary connection with the output O, the output planetary carrier X is output-only when the sun gears S are input-only one at a time. Specifically, the output planetary carrier X only shares a downstream rotary connection with the output O and, equally, does not share an upstream rotary connection with the input I.

The non-input/output ring gear R does not share either an upstream rotary connection with the input I or a downstream rotary connection with the output O. However, in relation to the sun gears S and the output planetary carrier X sharing such rotary connections, the non-input/output ring gear R is grounded, as shown in FIGS. 2A and 3A, for example, rotary but held against axial rotation, as shown in FIG. 4A and set forth below, for example, or otherwise anti-rotary when the sun gears S are input-only one at a time.

The transmission 142 is operable to shift between the speeds by the operation of the connecting clutches C1-C3. In the first speed, the compound planetary gear set P, with the output planetary carrier X being output-only and the non-input/output ring gear R being anti-rotary, has the first state of interconnected motion in which the compound planetary gear set P has the first planetary stage ratio when, by the operation of the connecting clutches C1-C3, the first sun gear S1 is input-only by itself. Specifically, the control module 128 operates the first connecting clutch C1 to engage between the input I and the first sun gear S1, and leaves the second connecting clutch C2 and the third connecting clutch C3 to disengage from between the input I and the second sun gear S2 and the third sun gear S3 respectively.

As the first sun gear S1 assumes axial rotation common with the input I, with the non-input/output ring gear R being anti-rotary, the long pinion gears N mesh between the first sun gear S1 at the first steps ST1 and the non-input/output ring gear R at the third steps ST3 to assume planetary motion. In association therewith, with the output planetary carrier X not sharing an upstream rotary connection with the input I, the output planetary carrier X assumes axial rotation common with the planetary motion of the long pinion gears N. As a result, the compound planetary gear set P transfers axial rotation of the input I into axial rotation of the output planetary carrier X at the first planetary stage ratio. In the compound planetary gear set P, the first planetary stage ratio is established by the number of teeth, $N_{S1}$, the first sun gear S1 has, the first number of teeth, $N_{ST1}$, the first steps ST1 have, the third number of teeth, $N_{ST3}$, the third steps ST3 have, and the number of teeth, $N_R$, the non-input/output ring gear R has, according to the relationship $1+(N_{ST1}/N_{S1})*(N_R/N_{ST3})$. The first transmission ratio, in turn, is the product of the first planetary stage ratio.

In the second speed, the compound planetary gear set P, with the output planetary carrier X being output-only and the non-input/output ring gear R being anti-rotary, has the second state of interconnected motion in which the compound planetary gear set P has the second planetary stage ratio when, by the operation of the connecting clutches C1-C3, the second sun gear S2 is input-only by itself. Specifically, the control module 128 operates the second connecting clutch C2 to engage between the input I and the second sun gear S2, and leaves the first connecting clutch C1 and the third connecting clutch C3 to disengage from between the input I and the first sun gear S1 and the third sun gear S3 respectively.

As the second sun gear S2 assumes axial rotation common with the input I, with the non-input/output ring gear R being anti-rotary, the long pinion gears N mesh between the second sun gear S2 at the second steps ST2 and the non-input/output ring gear R at the third steps ST3 to assume planetary motion. In association therewith, with the output planetary carrier X not sharing an upstream rotary connection with the input I, the output planetary carrier X assumes axial rotation common with the planetary motion of the long pinion gears N. As a result, the compound planetary gear set P transfers axial rotation of the input I into axial rotation of the output planetary carrier X at the second planetary stage ratio. In the compound planetary gear set P, the second planetary stage ratio is established by the number of teeth, $N_{S2}$, the second sun gear S2 has, the second number of teeth, $N_{ST2}$, the second steps ST2 have, the third number of teeth, $N_{ST3}$, the third steps ST3 have, and the number of teeth, $N_R$, the non-input/output ring gear R has, according to the relationship $1+(N_{ST2}/N_{S2})*(N_R/N_{ST3})$. The second transmission ratio, in turn, is the product of the second planetary stage ratio.

In the third speed, the compound planetary gear set P, with the output planetary carrier X being output-only and the non-input/output ring gear R being anti-rotary, has the third state of interconnected motion in which the compound planetary gear set P has the third planetary stage ratio when, by the operation of the connecting clutches C1-C3, the third sun gear S3 is input-only by itself. Specifically, the control module 128 operates the third connecting clutch C3 to engage between the input I and the third sun gear S3, and leaves the first connecting clutch C1 and the second connecting clutch C2 to disengage from between the input I and the first sun gear S1 and the second sun gear S2 respectively.

As the third sun gear S3 assumes axial rotation common with the input I, with the non-input/output ring gear R being anti-rotary, the long pinion gears N mesh between the third sun gear S3 at the third steps ST3 and the non-input/output ring gear R at the third steps ST3 to assume planetary motion. In association therewith, with the output planetary carrier X not sharing an upstream rotary connection with the input I, the output planetary carrier X assumes axial rotation common with the planetary motion of the long pinion gears N. As a result, the compound planetary gear set P transfers axial rotation of the input I into axial rotation of the output planetary carrier X at the third planetary stage ratio. In the compound planetary gear set P, the third planetary stage ratio is established by the number of teeth, $N_{S3}$, the third sun gear S3 has, the third number of teeth, $N_{ST3}$, the third steps ST3 have, and the number of teeth, $N_R$, the non-input/output ring gear R has, according to the relationship $1+(N_{ST3}/N_{S3})*(N_R/N_{ST3})$, which reduces to $1+N_R/N_{S3}$. The third transmission ratio, in turn, is the product of the third planetary stage ratio.

As shown in FIGS. 3A and 3B, for example, by the operation of the clutches C, in addition to the first planetary stage ratio, the second planetary stage ratio and the third planetary stage ratio, the compound planetary gear set P alternatively has a relatively lower direct stage ratio. Relatedly, in addition to the first speed corresponding to the first transmission ratio, the second speed corresponding to the second transmission ratio, and the third speed corresponding to the third transmission ratio, the transmission 142 has a fourth speed corresponding to a relatively lower fourth transmission ratio. In the fourth speed, to establish the fourth transmission ratio, the compound planetary gear set P has a fourth state of interconnected motion in which the compound planetary gear set P has the direct stage ratio.

In relation to the compound planetary gear set P, and the direct stage ratio, among the connecting clutches C, the transmission 142 includes an additional fourth connecting clutch C4 between the input I and the output planetary carrier X. As shown, the fourth connecting clutch C4 may, for example, be dog-type. In a normally-disengaged configuration, from its position between the input I and the output planetary carrier X, the fourth connecting clutch C4 is left to disengage from between the input I and the output planetary carrier X, whereby the output planetary carrier X does not share an upstream rotary connection with the input I. Alternatively, the fourth connecting clutch C4 is operable to engage between the input I and the output planetary carrier X, whereby the output planetary carrier X shares a clutched upstream rotary connection with the input I.

As noted above, from the perspective of the compound planetary gear set P, the sun gears S may serve as the acting input item and, in their roles as the acting input item, share upstream rotary connections with the input I. In relation to sharing upstream rotary connections with the input I, by the operation of the connecting clutches C1-C3, the sun gears S are alternatively input-only one at a time, as set forth above, or non-input/output all at once. Specifically, as set forth above, either the first connecting clutch C1, the second connecting clutch C2 or the third connecting clutch C3 is operated to engage between the input I and either the first sun gear S1, the second sun gear S2 or the third sun gear S3. Alternatively, the first connecting clutch C1, the second connecting clutch C2 and the third connecting clutch C3 are left to disengage from between the input I and the first sun gear S1, the second sun gear S2 and the third sun gear S3 respectively.

The output planetary carrier X may also serve as the acting input item and, in its role as the acting input item, share an upstream rotary connection with the input I. In relation to sharing a downstream rotary connection with the output O and sharing an upstream rotary connection with the input I, by the operation of the connecting clutch C4, the output planetary carrier X is alternatively output-only when the sun gears S are input-only one at a time or output-and-input when the sun gears S are non-input/output all at once. Specifically, when, in association with operating either the first connecting clutch C1, the second connecting clutch C2 or the third connecting clutch C3 to engage between the input I and either the first sun gear S1, the second sun gear S2 or the third sun gear S3, the fourth connecting clutch C4 is left to disengage from between the input I and the output planetary carrier X, the output planetary carrier X only shares a downstream rotary connection with the output O and, equally, does not share an upstream rotary connection with the input I. Alternatively, when, in association with leaving the first connecting clutch C1, the second connecting clutch C2 and the third connecting clutch C3 to disengage from between the input I and the first sun gear S1, the second sun gear S2 and the third sun gear S3 respectively, the fourth connecting clutch C4 is operated to engage between the input I and the output planetary carrier X, the output planetary carrier X shares a downstream rotary connection with the output O and, at the same time, shares an upstream rotary connection with the input I.

The non-input/output ring gear R does not share either an upstream rotary connection with the input I or a downstream rotary connection with the output O. However, in relation to the sun gears S and the output planetary carrier X sharing such rotary connections, the non-input/output ring gear R is grounded against axial rotation.

The transmission 142 is operable to shift between the speeds by the operation of the connecting clutches C1-C3, as set forth above, and the connecting clutch C4. In the first speed, the second speed, and the third speed, with the non-input/output ring gear R being grounded against axial rotation, the sun gears S are input-only one at a time by the operation of the connecting clutches C1-C3, as set forth above. Moreover, by the operation of the connecting clutch C4, the output planetary carrier X is output-only. Specifically, the control module 128 leaves the connecting clutch C4 to disengage from between the input I and the output planetary carrier X.

In the fourth speed, the compound planetary gear set P, with the non-input/output ring gear R being grounded against axial rotation, has the fourth state of interconnected motion in which the compound planetary gear set P has the direct stage ratio when, by the operation of the connecting clutches C1-C4, the sun gears S are non-input/output all at once and the output planetary carrier X is output-and-input. Specifically, the control module 128 leaves the first connecting clutch C1, the second connecting clutch C2 and the third connecting clutch C3 to disengage from between the input I and the first sun gear S1, the second sun gear S2 and the third sun gear S3 respectively, and operates the fourth connecting clutch C4 to engage between the input I and the output planetary carrier X.

With the output planetary carrier X sharing an upstream rotary connection with the input I, the output planetary carrier X assumes axial rotation common with the input I. In association therewith, with the sun gears S not sharing either upstream rotary connections with the input I or downstream rotary connections with the output O and the non-input/output ring gear R grounded against axial rotation, the long pinion gears N mesh between the sun gears S respectively at the steps ST and the non-input/output ring gear R at the third steps ST3 to assume planetary motion common with the axial rotation of the output planetary carrier X. As a result, the compound planetary gear set P transfers axial rotation of the input I into axial rotation of the output planetary carrier X at the direct stage ratio. The fourth transmission ratio, in turn, is the product of the direct stage ratio.

As shown in FIGS. 4A and 4B, for example, by the operation of the clutches C, in addition to the first planetary stage ratio, the second planetary stage ratio and the third planetary stage ratio, the compound planetary gear set P alternatively has a relatively lower direct stage ratio. Relatedly, in addition to the first speed corresponding to the first transmission ratio, the second speed corresponding to the second transmission ratio, and the third speed corresponding to the third transmission ratio, the transmission 142 has a fourth speed corresponding to a relatively lower fourth transmission ratio. In the fourth speed, to establish the fourth transmission ratio, the compound planetary gear set P has a fourth state of interconnected motion in which the compound planetary gear set P has the direct stage ratio.

In relation to the compound planetary gear set P, and the direct stage ratio, one of the clutches C is a grounded holding clutch C4 about the non-input/output ring gear R. As shown, the holding clutch C4 may, for example, be one-way-type. In a normally-engaged configuration, from its position about the non-input/output ring gear R, the holding clutch C4 is left to engage between the housing H and the non-input/output ring gear R, whereby the non-input/output ring gear R is held against axial rotation. Alternatively, the holding clutch C4 is operable to disengage from between the housing H and the non-input/output ring gear R, whereby the non-input/output ring gear R is released for axial rotation.

As noted above, from the perspective of the compound planetary gear set P, the sun gears S may serve as the acting input item and, in their roles as the acting input item, share upstream rotary connections with the input I. In relation thereto, by the operation of the connecting clutches C1-C3, the sun gears S are alternatively input-only one at a time, as set forth above, or input-only more than one at a time, with the remaining sun gears S, if any, being non-input/output. Specifically, as set forth above, either the first connecting clutch C1, the second connecting clutch C2 or the third connecting clutch C3 is operated to engage between the input I and either the first sun gear S1, the second sun gear S2 or the third sun gear S3. Alternatively, multiple of the first connecting clutch C1, the second connecting clutch C2 and the third connecting clutch C3 are operated to engage between the input I and multiple of the first sun gear S1, the second sun gear S2 and the third sun gear S3, as the case may be. When, in association with operating multiple of the first connecting clutch C1, the second connecting clutch C2 and the third connecting clutch C3 to engage between the input I and multiple of the first sun gear S1, the second sun gear S2 and the third sun gear S3, the remaining of the first connecting clutch C1, the second connecting clutch C2 or the third connecting clutch C3, if any, is left to disengage from between the input I and the first sun gear S1, the second sun gear S2 or the third sun gear S3, as the case may be.

In relation to sharing a downstream rotary connection with the output O, the output planetary carrier X is output-only. Specifically, the output planetary carrier X only shares a downstream rotary connection with the output O and, equally, does not share an upstream rotary connection with the input I.

The non-input/output ring gear R does not share either an upstream rotary connection with the input I or a downstream rotary connection with the output O. However, in relation to the sun gears S and the output planetary carrier X sharing such rotary connections, the non-input/output ring gear R is rotary. Moreover, by the operation of the holding clutch C4, the non-input/output ring gear R is alternatively held against axial rotation when the sun gears S are input-only one at a time or released for axial rotation when the sun gears S are input-only more than one at a time. Specifically, when, in association with operating either the first connecting clutch C1, the second connecting clutch C2 or the third connecting clutch C3 to engage between the input I and either the first sun gear S1, the second sun gear S2 or the third sun gear S3, the holding clutch C4 is left to engage between the housing H and the non-input/output ring gear R, the non-input/output ring gear R is held against axial rotation. Alternatively, when, in association with operating multiple of the first connecting clutch C1, the second connecting clutch C2 and the third connecting clutch C3 to engage between the input I and multiple of the first sun gear S1, the second sun gear S2 and the third sun gear S3, the holding clutch C4 is operated to disengage from between the housing H and the non-input/output ring gear R, the non-input/output ring gear R is released for axial rotation.

The transmission 142 is operable to shift between the speeds by the operation of the connecting clutches C1-C3, as set forth above, and the holding clutch C4. In the first speed, the second speed, and the third speed, with the output planetary carrier X being output-only, the sun gears S are input-only one at a time by the operation of the connecting clutches C1-C3, as set forth above. Moreover, by the operation of the holding clutch C4, the non-input/output ring gear R is held against axial rotation. Specifically, the control module 128 leaves the holding clutch C4 to engage between the housing H and the non-input/output ring gear R.

In the fourth speed, the compound planetary gear set P, with the output planetary carrier X being output-only, has the fourth state of interconnected motion in which the compound planetary gear set P has the direct stage ratio when, by the operation of the connecting clutches C1-C3 and the holding clutch C4, the sun gears S are input-only more than one at a time and the non-input/output ring gear R is released for axial rotation. Specifically, the control module 128 operates multiple of the first connecting clutch C1, the second connecting clutch C2 and the third connecting clutch C3 to engage between the input I and multiple of the first sun gear S1, the second sun gear S2 and the third sun gear S3, and operates the holding clutch C4 to disengage from between the housing H and the non-input/output ring gear R.

As multiple of the sun gears S assume axial rotation common with the input I, with the non-input/output ring gear R released for axial rotation, the long pinion gears N lock between the sun gears S respectively at the steps ST and the non-input/output ring gear R at the third steps ST3 and assume planetary motion common with the axial rotation of the sun gears S, and the non-input/output ring gear R assumes axial rotation common with the planetary motion of the long pinion gears N. In association therewith, with the output planetary carrier X not sharing an upstream rotary connection with the input I, the output planetary carrier X assumes axial rotation common with the planetary motion of the long pinion gears N. As a result, the compound planetary gear set P transfers axial rotation of the input I into axial rotation of the output planetary carrier X at the direct stage ratio. The fourth transmission ratio, in turn, is the product of the direct stage ratio.

Operating the Propulsion System

The vehicle 100 is equipped, in operation, to perform vehicle functions on behalf of the vehicle 100, and thereby satisfy corresponding vehicle demands on behalf of the vehicle 100. Among other things, given a propulsion demand, the propulsion system 132 is operable to satisfy the propulsion demand. For instance, given a demand to power the wheels 114, the propulsion system 132 is operable to satisfy the demand to power the wheels 114. Specifically, the motors 144 are operable to power the wheels 114 through the transmission 142 and, in association with the operation of the motors 144 to power the wheels 114 therethrough, the transmission 142 is operable to shift between the speeds.

As part of operating the vehicle 100 under the orchestration thereof, the control module 128 gathers information about the vehicle 100, including user inputs requesting powering the wheels 114, information about the operation of the vehicle 100 and other information about the vehicle 100 detected by the sensor system 122. As part of its evaluation of the information about the vehicle 100, the control module 128 monitors for and identifies one or more demands to power the wheels 114, as well as one or more driving situations. When the control module 128 identifies a demand to power the wheels 114, based on the current driving situation, the control module 128 operates the transmission 142 to shift between the speeds in association with operating the motors 144 to power the wheels 114 through the transmission 142.

It is contemplated that using the one compound planetary gear set P to establish the multiple same-sign transmission ratios corresponding with the multiple unidirectional speeds equips the propulsion system 132 to efficiently satisfy demands to power the wheels 114 across a range of different driving situations while minimizing the size, complexity, cost and the like of the transmission 142.

For instance, in any combination of launch, low speed, high acceleration, high torque demand and like driving situations, the transmission 142 is operable to shift to the first speed in association with the motors 144 efficiently operating with any combination of low speed and high torque to power the wheels 114 through the transmission 142. Moreover, in any combination of cruising, high speed, low acceleration, low torque demand and like driving situations, the transmission 142 is operable to shift to the second speed, the third speed and the fourth speed in association with the motors 144 efficiently operating with any combination of high speed and low torque to power the wheels 114 through the transmission 142. Moreover, in reverse driving situations, rather than the transmission 142 having another dedicated transmission ratio corresponding with another dedicated speed therefor, and the compound planetary gear set P having another dedicated state of interconnected motion to establish the other transmission ratio, the transmission 142 is operable to shift to the first speed in association with the motors 144 operating in reverse to power the wheels 114 through the transmission 142.

Moreover, it is contemplated that using the one compound planetary gear set P with the multiple sun gears S and the stepped long pinion gears N equips the transmission 142 to offer the multiple same-sign transmission ratios corresponding with the multiple unidirectional speeds in small evenly-distributed steps.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A transmission, comprising:
a compound planetary gear set, the compound planetary gear set including multiple sun gears and a single non-input/output ring gear, a long pinion gear meshed therebetween, and an output planetary carrier carrying the long pinion gear, the long pinion gear including multiple steps, and meshed with the sun gears respectively at the steps and with the non-input/output ring gear at one step, wherein with each sun gear alternatively being input-only or non-input/output, the sun gears are selectively input-only one at a time, and the non-input/output ring gear is anti-rotary and the output planetary carrier is output-only when the sun gears are input-only one at a time.

2. The transmission of claim 1, wherein the non-input/output ring gear is a permanently grounded non-input/output ring gear, and the output planetary carrier is a permanently output-only output planetary carrier.

3. The transmission of claim 1, wherein the non-input/output ring gear is a permanently grounded non-input/output ring gear, the sun gears are alternatively input-only one at a time or non-input/output all at once, and the output planetary carrier is alternatively output-only when the sun gears are input-only one at a time or output-and-input when the sun gears are non-input/output all at once.

4. The transmission of claim 1, wherein the output planetary carrier is a permanently output-only output planetary carrier, the sun gears are alternatively input-only one at a time or input-only more than one at a time, and the non-input/output ring gear is alternatively held when the sun gears are input-only one at a time or released when the sun gears are input-only more than one at a time.

5. The transmission of claim 1, wherein the compound planetary gear set includes a total of two sun gears, and the long pinion gear includes a total of two steps.

6. The transmission of claim 1, wherein the compound planetary gear set includes three or more sun gears, and the long pinion gear includes three or more steps.

7. The transmission of claim 1, wherein the compound planetary gear set is the only planetary gear set connected from an input to an output.

8. A vehicle, comprising:
a drivetrain with a wheel;
an electric motor; and
a transmission through which the electric motor is connected to the drivetrain to power the wheel, the transmission including:
an input from which the electric motor is connected;
an output to which the drivetrain is connected; and
a compound planetary gear set connected from the input to the output, the compound planetary gear set including multiple sun gears connectable from the input and a single non-input/output ring gear, a long pinion gear meshed therebetween, and an output planetary carrier carrying the long pinion gear and connected to the output, the long pinion gear including multiple steps, and meshed with the sun gears respectively at the steps and with the non-input/output ring gear at one step, wherein with each sun gear alternatively being input-only or non-input/output, the sun gears are selectively input-only one at a time, and the non-input/output ring gear is anti-rotary and the output planetary carrier is output-only when the sun gears are input-only one at a time.

9. The vehicle of claim 8, wherein the non-input/output ring gear is a permanently grounded non-input/output ring gear, and the output planetary carrier is a parmanently output-only output planetary carrier.

10. The vehicle of claim 8, wherein the non-input/output ring gear is a permanently grounded non-input/output ring gear, the sun gears are alternatively input-only one at a time or non-input/output all at once, and the output planetary carrier is alternatively output-only when the sun gears are input-only one at a time or output-and-input when the sun gears are non-input/output all at once.

11. The vehicle of claim 8, wherein the output planetary carrier is a permanently output-only output planetary carrier, the sun gears are alternatively input-only one at a time or input-only more than one at a time, and the non-input/output ring gear is alternatively held when the sun gears are input-only one at a time or released when the sun gears are input-only more than one at a time.

12. The vehicle of claim 8, wherein the compound planetary gear set includes a total of two sun gears, and the long pinion gear includes a total of two steps.

13. The vehicle of claim 8, wherein the compound planetary gear set includes three or more sun gears, and the long pinion gear includes three or more steps.

14. The vehicle of claim 8, wherein the compound planetary gear set is the only planetary gear set connected from the input to the output.

15. A transmission, comprising:
a rotary input;
a rotary output;
a compound planetary gear set, the compound planetary gear set including multiple rotary sun gears and a single non-input/output ring gear, a long pinion gear meshed therebetween, and a rotary output planetary carrier carrying the long pinion gear and sharing a downstream rotary connection with the output, the long pinion gear including multiple steps, and meshed with the sun gears respectively at the steps and with the non-input/output ring gear at one step; and
multiple rotary connecting clutches between the input and the sun gears respectively; wherein
by the operation of the connecting clutches, with each sun gear alternatively only sharing an upstream rotary connection with the input or not sharing either an upstream rotary connection or a downstream rotary connection, the sun gears selectively only share the upstream rotary connections with the input one at a time; and
in the case in which the sun gears only share the upstream rotary connections with the input one at a time, the non-input/output ring gear is anti-rotary and the output planetary carrier only shares the downstream rotary connection with the output.

16. The transmission of claim 15, wherein the non-input/output ring gear is a permanently grounded non-input/output ring gear, and the output planetary carrier permanently only shares the downstream rotary connection with the output.

17. The transmission of claim 15, further comprising:
an additional rotary connecting clutch between the input and the output planetary carrier; wherein
the non-input/output ring gear is a permanently grounded non-input/output ring gear; and
by the operation of the connecting clutches, the sun gears alternatively only share the upstream rotary connections with the input one at a time, in which case the output planetary carrier only shares the downstream rotary connection with the output, or do not share either upstream rotary connections or downstream rotary connections all at once, in which case the output planetary carrier shares the downstream rotary connection with the output and shares an upstream rotary connection with the input.

18. The transmission of claim 15, further comprising:
a permanently grounded holding clutch about the non-input/output ring gear; wherein
the non-input/output ring gear is rotary and the output planetary carrier permanently only shares the downstream rotary connection with the output; and
by the operation of the connecting clutches and the holding clutch, the sun gears alternatively only share the upstream rotary connections with the input one at a time, in which case the non-input/output ring gear is held, or only share the upstream rotary connections with the input more than one at a time, in which case the non-input/output ring gear is released.

19. The transmission of claim 15, wherein the compound planetary gear set includes a total of two sun gears, and the long pinion gear includes a total of two steps.

20. The transmission of claim 15, wherein the compound planetary gear set includes three or more sun gears, and the long pinion gear includes three or more steps.

* * * * *

UNITED STATES PATENT AND TRADEMARK OFFICE
CERTIFICATE OF CORRECTION

| | | |
|---|---|---|
| PATENT NO. | : 10,844,937 B2 | Page 1 of 1 |
| APPLICATION NO. | : 15/929059 | |
| DATED | : November 24, 2020 | |
| INVENTOR(S) | : Rippelmeyer | |

It is certified that error appears in the above-identified patent and that said Letters Patent is hereby corrected as shown below:

In the Claims

Column 19, Line 32: Claim 9 replace "parmamently" with --permanently--

Signed and Sealed this
Fourth Day of May, 2021

Drew Hirshfeld
*Performing the Functions and Duties of the
Under Secretary of Commerce for Intellectual Property and
Director of the United States Patent and Trademark Office*